Dec. 14, 1965　　　　　　　A. REMESAT　　　　　　　3,222,985
PROJECTION PHOTOGRAPHIC COLOR PRINTING APPARATUS
Filed Jan. 29, 1963　　　　　　　　　　　　　3 Sheets-Sheet 1
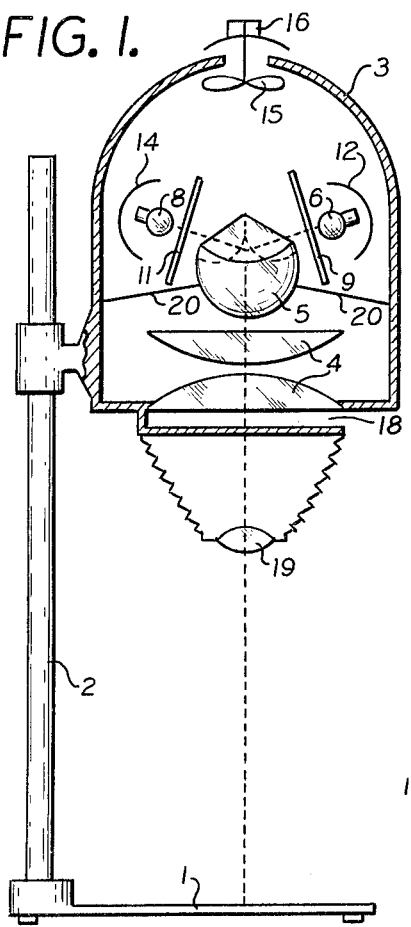
FIG. 1.
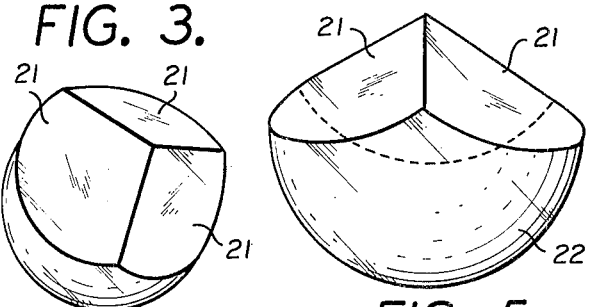
FIG. 3.
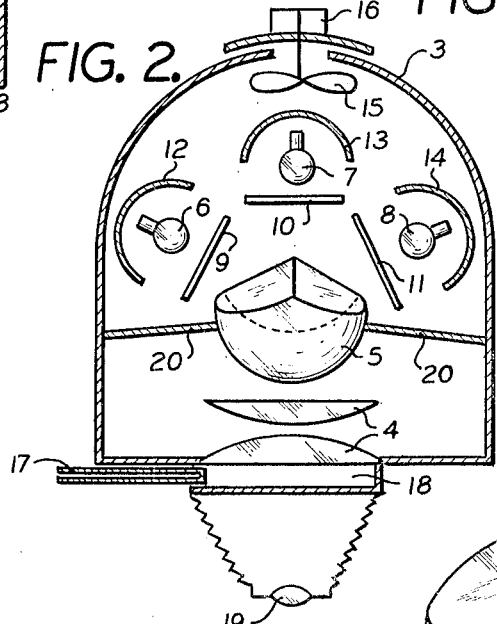
FIG. 2.
FIG. 5.
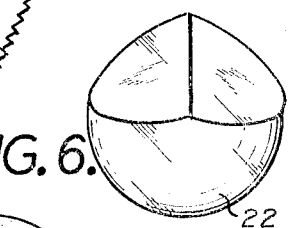
FIG. 6.
FIG. 4.
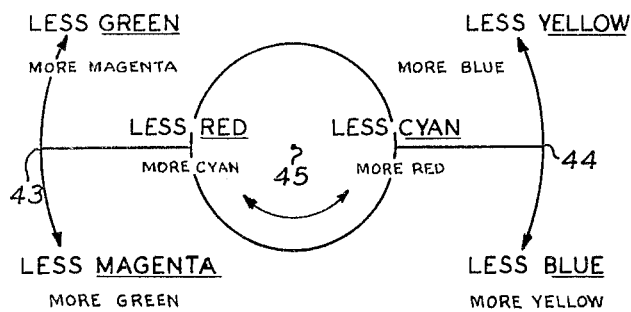
FIG. 7.
INVENTOR
ARMIN REMESAT
BY

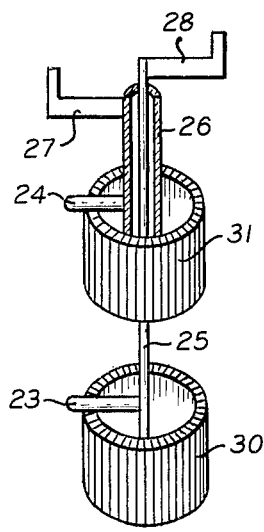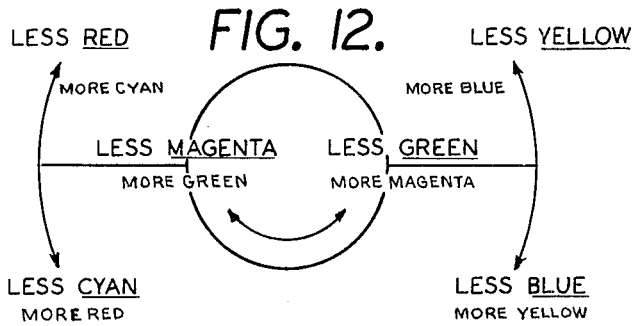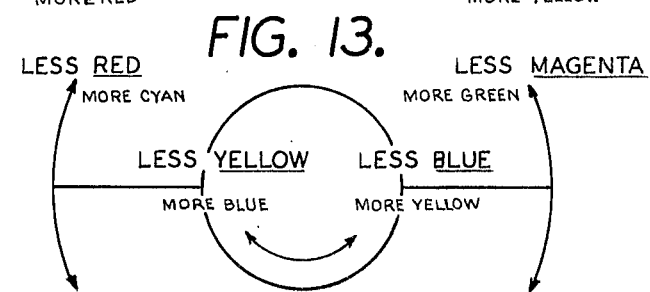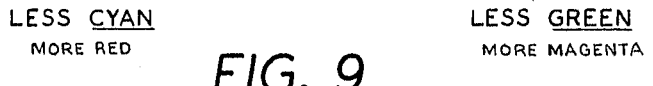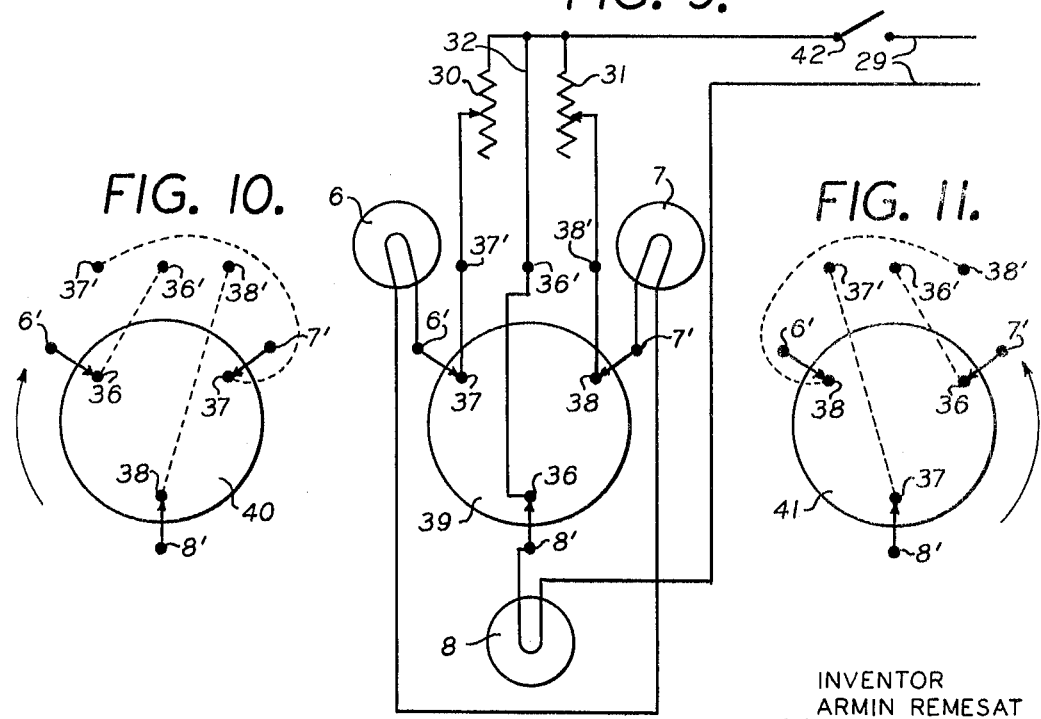

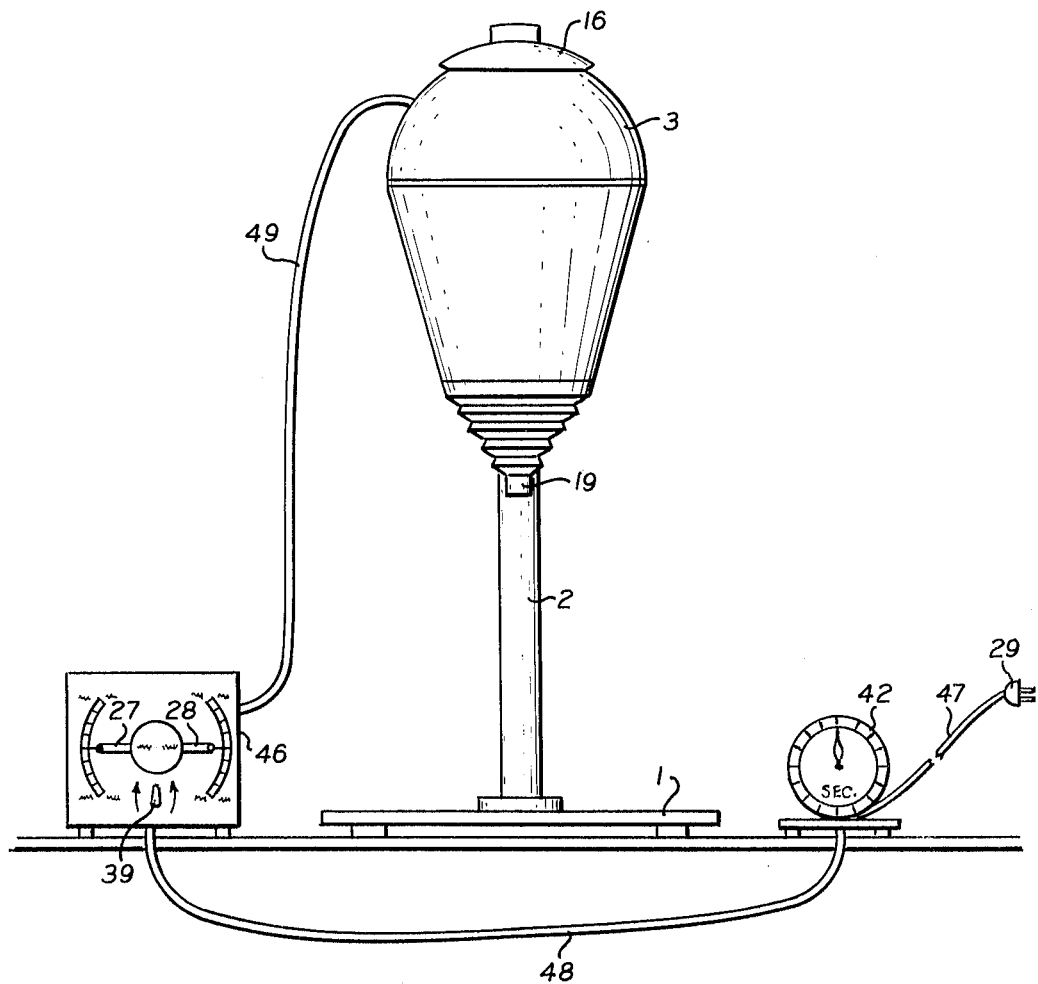

United States Patent Office 3,222,985
Patented Dec. 14, 1965

3,222,985
PROJECTION PHOTOGRAPHIC COLOR
PRINTING APPARATUS
Armin Remesat, Great Neck, N.Y.
(25 Robinson St., Shoreham, N.Y. 11786)
Filed Jan. 29, 1963, Ser. No. 254,810
12 Claims. (Cl. 88—24)

This invention relates to the art of producing photographic color prints from a color transparency.

It is an object of my invention to accurately expose photographic multilayer color emulsions, giving special attention to control the color balance and the amount of light reaching the emulsions.

Various methods for producing color prints have been suggested previously.

The most common color printing materials consist at present of an image bearing support (film or paper) and three layers of emulsion, each being sensitive to red, green and blue, respectively, and thus capable of reproducing the whole range of the visible color spectrum. In order to obtain correct reproductions, each color sensitive layer must be exposed very accurately.

In order to attain this, in the hitherto known processes each layer of the emulsion has been given a separate exposure, through a red, green, and blue filter. Hereby the print and the negative has to remain in exactly the same position, while the three filters are inserted manually or mechanically in the light path.

Another method consists of inserting a filter pack under the light source for balancing the light for a single uniformly colored light exposure.

Both methods require adequately trained operators. Moreover the printing operation can be quite laborious and time consuming when many filter changes are required, and especially if the operation is performed manually. In the three-filter operation, misregister through vibration caused by filter changes and other movements is a hazard.

Filterpacks, on the other hand, are prone to errors especially in large volume operations.

I have now found that these drawbacks can be eliminated, and very satisfactory results can be obtained by using a device of the following construction.

In carrying out my invention, I use three vari-colored light sources and integrate these into uniformly colored light in the manner described hereinafter and illustrated in the appended drawings.

Before going into detail about this method of light integration and color balancing, I want to state the difference between light integration and diffusion.

In the diffusion merely a spreading of a certain amount of light over a larger area takes place.

Examples of diffusion materials are sheets of ground glass, also called frosted glass, and sheets of milk glass also called opal glass. Combinations of the foregoing are also used for diffusion.

The diffusion betrays the origin of the light. No matter how the diffusion materials are arranged, the center, or the direction of the light source can be detected. This center is often referred to as a hot spot.

Because diffusion results in uneven light, and is unsuitable for mixing different colored light sources, a device called "Integrator" or "Light Mixer" is used for mixing light sources of different colors into uniformly colored light.

The appended drawings illustrate some specific embodiments of and some best modes for carrying out the invention, to which the invention is not limited.

In the drawings:

FIG. 1 is a diagrammatic elevation of an embodiment of the invention;

FIG. 2 is a diagrammatic view of a section of the invention;

FIG. 3 shows an integrator which performs the function of light mixing in this invention;

FIG. 4 shows the same integrator as FIG. 3, in bottom view;

FIG. 5 shows the same integrator in side view;

FIG. 6 shows a modified form of the integrator;

FIG. 7 shows a principal color control panel;

FIG. 8 illustrates a coaxial assembly of two variable resistors;

FIG. 9 is a wiring diagram;

FIGS. 10 and 11 illustrate a permutation switch in its different phases as it functions in FIG. 9;

FIGS. 12 and 13 show the color control panels with directions of color control changed by the permutation switch in FIG. 9;

FIG. 14 illustrates an assembly of the parts forming the invention.

Referring now to the drawings in detail, in FIG. 1 a photographic enlarger has a base 1 assemble with a column 2, on which the enlarger head generally denoted 3 is slidably or adjustably guided and supported. Head 3 comprises an optical condenser 4. Reference symbol 5 denotes an element of the invention herein called integrator. Parts 6, 7, 8, best shown in FIG. 2, are electric light bulbs mounted in sockets and attached to the casing of the head 3. The light of these three bulbs passes through colored filters 9, 10, 11, as described in more detail hereinafter. The path of light is directed by reflectors 12, 13, 14. Heat of the bulbs is preferably dissipated by a ventilator 15 driven by electric motor 16. 20 is a light shield, shielding the condenser, if desired, from direct light from the lamps. 17 is a negative-carrier consisting of two glass plates between which the transparency is held flat during the printing operation. 18 is the slot that accommodates the negative-carrier. 19 is the projecting objective. Focussing means and other details not forming part of the invention are not shown in the drawing.

The object of the light integrator 5, further illustrated in FIGS. 3, 4, 5, and modified in FIG. 6, is to gather all incoming light rays through the surfaces 21 and permit passage of the said rays in the form of uniformly colored (integrated) light through the bottom 22, of FIGS. 4 and 5.

FIG. 6 shows a modification which can be utilized for two-color integration.

The light integrator illustrated in FIGS. 3, 4, 5, consists of light transmitting material such as glass. It has a semi-spherically shaped base 22 and a pyramidal roof 21 which increases the light gathering capability resulting in increased output brightness on the bottom 22. Its further object is to allow the light sources to be moved out of the direct light path, thus avoiding the formation of hot spots, which in turn would cause uneven color in the photographic printing material.

Referring to the color filters 9, 10, 11, it is noted that the glass of the light bulbs may be colored and in that case separate light filters are not necessary.

A double or single roof on the integrator has an effect of the same kind as a triple or quadruple roof. However, in a conical roof design the light output would be reduced to be approximately equal to that of a cylinder.

The surface of the integrator has a ground glass finish (polished matte). The integrator consists preferably of glass, however materials with properties like glass may be also used, such as for example, plexiglass, or physically similar plastics. It may be colorless, at least partially colored, semitransparent, frosted, or opalescent. It is capable of integrating light also when formed into any shape with straight or round corners, edges or sides. It will mix two or more different colored lights into one new even color. It will also increase output brightness of uniform white or colored light by adding more input light sources. Polarized light may be used as well.

Referring to FIG. 6, it is noted that this modification is suitable for use in printing black and white material which is designed to yield different gradations when exposed with different colored lights.

The exposure of the sensitive material may be accomplished by one of the following methods:

FIG. 9 shows one wiring diagram suitable for individual brightness control of the three light sources 6, 7, 8, with two variable resistors 30 and 31.

For practical operation one bulb should always be left in full brightness position.

Assuming that the three light sources are separately filtered through one red, green and blue filter, and assuming also that the red light variable resistor would be in full brightness position, and assuming further that the two remaining variable resistors would be coaxially assembled (FIG. 8) with green light lever 27 and blue light lever right 28 the color control panel shown in FIG. 7 would apply in negative-positive printing.

The brightness of the three colored lamps may be pre-adjusted to the required brightness and the color material may be given a single uniformly colored light exposure, whereby the basic correct color balance of the light may be found by trial and error. Adjustment of the lamp brightness may be achieved with the aid of (A) variable resistor, (B) neutral density filters, (C) by individual polarization of the individually colored light sources. One method would consist in the use of three separate timing switches, each connected to one bulb, which expose the color material simultaneously. The length of timing interval could be adjusted for the best color balance and overall exposure. It is also possible to perform the last operation in sequence, with the advantage of having no moving parts in the projection system.

Referring to FIG. 9, the wiring diagram shows how bulbs 6, 7, 8 are wired in parallel with two resistors 30 and 31. The permutation switch 39 allows one bulb to receive direct current supply 32, while it connects the other two bulbs with the two resistors 30 and 31.

The permutation switch itself consists of a rotating disc with the center marked "+" in FIG. 9. It has three rotating inner terminals 36, 37 and 38. These three inner terminals receive their current from 36', 37' and 38' continuously.

These three inner terminals also redistribute the current received from 36', 37' and 38' to outer terminals 6', 7' and 8' which in turn lead directly into bulbs 6, 7, and 8.

The permutation switch 39 is in normal position in FIG. 9.

The numbers 36, 37, and 38 denote the revolving inner terminals in contrast to 6', 7' and 8' which denote the fixed outer termials.

By turning the permutation switch 39 of FIG. 9, the following positions are possible:

FIG. 9, Position 39 _____ 36–8'  37–6'  38–7'
FIG. 10, Position 40 _____ 36–6'  37–7'  38–8'
FIG. 11, Position 41 _____ 36–7'  37–8'  38–6'

In FIG. 9, bulb 8 receives direct current supply, whereas in FIG. 10 the direct current supply goes to bulb 6, and in FIG. 11, direct current supply goes to bulb 7 while the two remaining bulbs are connected to the variable resistors 30 and 31. 29 is the main current supply, and 42 a timing switch.

FIG. 8 shows two variable resistors in diagrammatic, perspective view, assembled along the same axis. This arrangement allows practical color corrections, as shown in the principal color control panel in FIG. 7.

In FIG. 8, two variable resistors 30 and 31 are held motionless, while sliding contacts 23 and 24, which are attached to the axles 25 and 26, transmit current of variable resistance, controlled by the two levers 27 and 28.

Lever 27 of FIG. 8 shifts color as shown in FIG. 7 at 43.

Lever 28 of FIG. 8 shifts color as shown in FIG. 7 at 44.

Both levers of FIG. 8 turned together shift color as shown in FIG. 7 at 45.

An example of operating the color printing apparatus is as follows:

A colored print from a color film-negative is produced on paper as follows:

First, the negative is placed between the two glass plates 17 (see FIG. 1), and then inserted into slot 18 of the enlarger. The room light is then turned off, and the negative is projected onto the easel 1.

In FIG. 1, all lights are burning with full brightness, and each lamp is filtered through its corresponding color filter. The filter types are generally specified by the manufacturers of the color printing material.

Then the magnification ratio and sharpness of the projected image is adjusted. Subsequently, the projection light is turned off and the sensitive color printing paper is placed into a predetermined position on the easel.

A trial exposure is now made, from the results of which the operator will be able to determine the correction of color balance and overall exposure as follows:

Assuming that in practical work printing is done from negative to positive (complementary filtration) lever 44 of FIG. 7 would come to its end position and the print is still too cyan; the red light bulb is now at full brightness, the green light bulb is somewhere in between and the blue light bulb is in full brightness. The operator has now red and some green plus blue which gives almost white when integrated.

In order to correct for cyan predominance in negative-positive printing green and blue light is needed; furthermore, red has to be turned down, that is, red has to be connected with a resistor.

This is accomplished by the permutation switch in FIG. 9, shown in all its positions at 39, 40, and 41.

Said switch is now turned so that it will give green direct current supply and connect red light to lever 43 FIG. 7 left and blue light to lever 44, right.

Now the color balance can be shifted as shown in FIG. 12. In case blue comes to its end position, it will be necessary to turn down red and green. In this case, blue will receive full current supply and red and green are connected with the variable resistors. Then the principal color control panel in FIG. 13 would apply.

The general rule for permutation in the color control is as follows:

The color which belongs to the bulb with full current supply (brightest lamp) gives the maximum color correction. Consequently, the permutation switch should be turned to give full current supply to that particular color which needs the most correction. The two remaining colors are then balanced as needed.

FIG. 14 shows, by way of example, an arrangement of the parts of my color printing apparatus, set up for practical work.

In this illustration, 29 is the inlet plug for the electricity supply of the entire system (further illustrated in FIG. 9). The timing switch 42 permits the timing (in seconds) of the electric current for correct exposure. 46 is the housing of the two variable resistors also shown in FIG. 8. 27 and 28 are the color control levers, and 39 the permutation switch which is further illustrated in its mechanical functions in FIG. 9, FIG. 10, and FIG. 11.

Further shown in FIG. 14 are parts of the enlarging system: base 1, assembled with column 2, to which the head 3 is adjustably fastened. 16 is the housing of the ventilator, and 19 is the projecting objective.

Electrical cable connections are 47, from the inlet plug 29 to the timer 42. 48 connects the timer 42 with the variable resistors in housing 46 and 49, from the variable resistors to the enlarger head 3.

What is claimed is:

1. A projection photographic printing apparatus adapted to utilize multiple sensitized photographic material, comprising illuminating means including three spaced light sources, each of which has suitably colored filtering means, and means for operating and regulating the operation of the light sources; an integrator for receiving and mixing the different colored light rays emitted by said three light sources; an optical condenser; means for accommodating a negative-carrier in the path of the light rays passing through the apparatus to the projecting objective; and a projecting objective, arranged in sequence; said integrator consisting of light-transmitting material which has a substantially spherically shaped base and pyramidal roof, has a ground glass finish on its surface and is arranged between said three light sources, and is provided with a reflector for directing the light rays emitted by said light sources through the filter toward the roof of the integrator.

2. An apparatus as claimed in claim 1, in which the light sources, their reflectors, the integrator and condenser are fastened in and housed by a head provided on its top with ventilating means dissipating the heat derived from the light sources, said head being adapted to be adjustably fastened to and carried by a stand having a column for supporting the head.

3. An apparatus as claimed in claim 1, in which the light sources are electric bulbs.

4. An apparatus as claimed in claim 3, in which the electric bulbs consist of suitably colored glass.

5. An apparatus as claimed in claim 3, in which color filters are arranged between the electric bulbs and the integrator.

6. An apparatus as claimed in claim 1, comprising a principal color control panel in order to allow color corrections.

7. An apparatus as claimed in claim 1, comprising a support for the sensitive sheet material.

8. An apparatus as claimed in claim 7, in which the support is formed at a predetermined place on the base of the stand for carrying the head.

9. An apparatus as claimed in claim 1, comprising means for balancing colored light by regulating input of electricity into the light sources by electric resistor type regulating devices.

10. An apparatus as claimed in claim 9, comprising two electric resistor type regulating devices with tricolor distribution achieved through a permutation switch.

11. An apparatus as claimed in claim 10, comprising two coaxially mounted resistors.

12. An apparatus as claimed in claim 1, comprising two resistors connected to one permutation switch, means for distributing electricity toward three light sources, in order to permit current distribution as necessitated by color correction requirements for photographic color printing.

References Cited by the Examiner

UNITED STATES PATENTS 3,028,483  4/1962  Simmon _____ 88—24 X

FOREIGN PATENTS 538,816  1/1956  Italy.

NORTON ANSHER, *Primary Examiner.*

EVON C. BLUNK, *Examiner.*